US012662981B2

(12) United States Patent
Susca et al.

(10) Patent No.: US 12,662,981 B2
(45) Date of Patent: Jun. 23, 2026

(54) DUAL VARIABLE DISPLACEMENT PUMP FUEL SYSTEM WITH FOC BYPASS AND WASHED ACTUATION FLOW

(71) Applicant: Hamilton Sundstrand Corporation, Charlotte, NC (US)

(72) Inventors: Ryan Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/795,819

(22) Filed: Aug. 6, 2024

(65) Prior Publication Data

US 2026/0043383 A1 Feb. 12, 2026

(51) Int. Cl.
*F02M 59/20* (2006.01)
*F02C 7/236* (2006.01)
(Continued)

(52) U.S. Cl.
CPC ........... *F02M 59/205* (2013.01); *F02C 7/236* (2013.01); *F02M 37/06* (2013.01); *F02M 37/18* (2013.01); *F02M 37/32* (2019.01); *F02M 59/46* (2013.01)

(58) Field of Classification Search
CPC ........ F02C 7/236; F02M 37/06; F02M 37/18; F02M 37/32; F02M 59/205; F02M 59/46
See application file for complete search history.

(56) References Cited

U.S. PATENT DOCUMENTS 3,402,556 A * 9/1968 Spence ..................... F02C 9/16
60/241
3,472,480 A * 10/1969 Williams ................ F16K 31/12
251/63
(Continued)

FOREIGN PATENT DOCUMENTS

EP 3482810 B1 12/2020
GB 2289722 A * 11/1995 .............. F02C 7/228
(Continued)

OTHER PUBLICATIONS

Extended European Search Report for European Patent Application No. 24202042.8, dated Feb. 13, 2025, 8 pages.
(Continued)

*Primary Examiner* — Joseph A Stoklosa
(74) *Attorney, Agent, or Firm* — Kinney & Lange, P.A.; Nick E Stewart

(57) ABSTRACT

A system includes an actuation pump sub-system (APS) with an inlet configured to feed fuel from a fuel source into the actuation pump sub-system, a first outlet configured for connecting the APS in fluid communication with an afterburner selector valve, a second outlet, and a third outlet for connecting the APS in fluid communication with an actuation system to supply washed fuel flow for actuation. A main pump and control sub-system (MPCS) has a main inlet connected in fluid communication with the supply line downstream of the second outlet of the APS, and a main outlet for supplying fuel to a downstream gas generator. An afterburner pump in fluid communication to supply an afterburner control. An afterburner selector valve (ASV) in fluid communication with the MPCS, the wash line, and the afterburner pump.

16 Claims, 1 Drawing Sheet

(51) Int. Cl.

| | |
|---|---|
| *F02M 37/06* | (2006.01) |
| *F02M 37/18* | (2006.01) |
| *F02M 37/32* | (2019.01) |
| *F02M 59/46* | (2006.01) |

(56) References Cited

U.S. PATENT DOCUMENTS

| | | | |
|---|---|---|---|
| 3,611,802 | A | 10/1971 | Mccombs |
| 4,469,594 | A | 9/1984 | Poetter |
| 5,116,362 | A | 5/1992 | Arline et al. |
| 6,102,001 | A | 8/2000 | McIevige |
| 6,125,826 | A | 10/2000 | Brocard et al. |
| 6,584,762 | B2 | 7/2003 | Snow et al. |
| 6,584,792 | B2 | 7/2003 | Bay |
| 6,810,674 | B2 | 11/2004 | Clements |
| 7,983,541 | B2 | 7/2011 | Clements |
| 8,166,765 | B2 | 5/2012 | Baker et al. |
| 8,172,551 | B2 | 5/2012 | Baker |
| 8,313,656 | B2 | 11/2012 | Gibbons et al. |
| 8,647,503 | B2 | 2/2014 | Clements et al. |
| 8,893,466 | B2 | 11/2014 | Reuter |
| 9,140,191 | B2 | 9/2015 | Haugsjaahabink |
| 9,617,923 | B2 | 4/2017 | Griffiths |
| 9,850,917 | B2 | 12/2017 | Mueller et al. |
| 10,502,138 | B2 | 12/2019 | Reuter et al. |
| 10,612,467 | B2 | 4/2020 | Keeler et al. |
| 11,203,978 | B2 | 12/2021 | O'Rorke et al. |
| 11,674,455 | B2 | 6/2023 | Rutar |
| 11,713,724 | B1 | 8/2023 | O'rorke et al. |
| 11,898,496 | B1 | 2/2024 | Susca et al. |
| 12,031,487 | B1 | 7/2024 | Susca et al. |
| 2015/0101339 | A1* | 4/2015 | Veilleux, Jr. ............ F02C 7/236 |
| | | | 60/734 |
| 2016/0108819 | A1 | 4/2016 | Dreher et al. |
| 2017/0306856 | A1 | 10/2017 | Bickley |
| 2018/0340501 | A1 | 11/2018 | Ni et al. |
| 2020/0124002 | A1 | 4/2020 | Uhkoetter et al. |
| 2024/0200553 | A1 | 6/2024 | Susca et al. |
| 2024/0240631 | A1 | 7/2024 | Susca et al. |

FOREIGN PATENT DOCUMENTS

| | | | |
|---|---|---|---|
| RU | 2458234 | C1 | 8/2012 |
| WO | 2013165487 | A2 | 11/2013 |

OTHER PUBLICATIONS

Search Report from Application No. 2515458.4, dated Mar. 2, 2026, 4 pages.

* cited by examiner

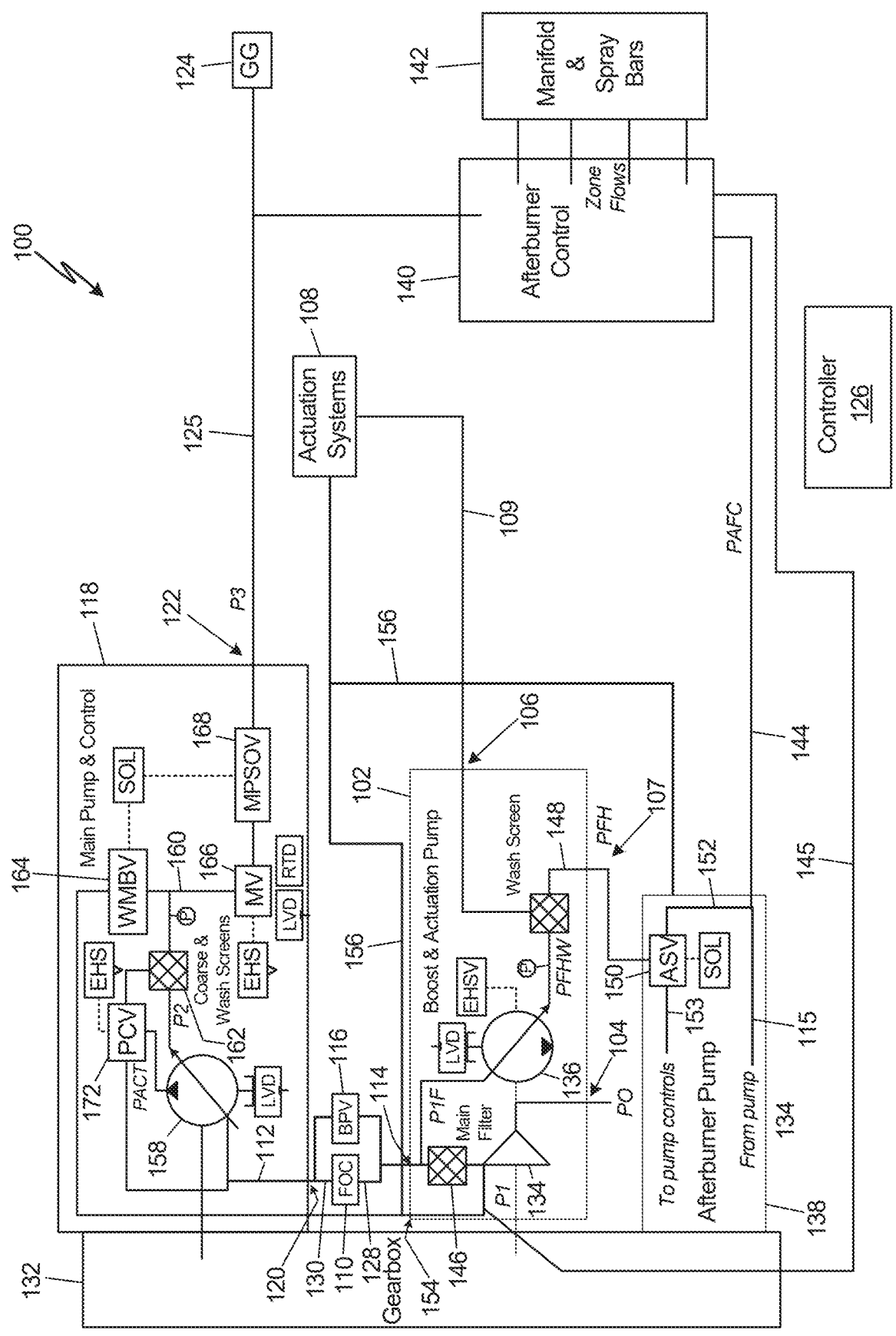

DUAL VARIABLE DISPLACEMENT PUMP FUEL SYSTEM WITH FOC BYPASS AND WASHED ACTUATION FLOW

BACKGROUND

The present disclosure relates to fuel systems, and more particularly to fuel systems for aircraft.

In modern aircraft it would be advantageous to eliminate the thermal recirculation system as well as external plumbing, pipe connections, valves, filters, and other components to the extent possible. This would reduce the number of fuel system components, and free space for carrying more fuel. However, thermal recirculation cannot typically be eliminated because the fuel oil coolers (FOC) in typical aircraft have over-temperature heat loads at low burn flow conditions, necessitating thermal recirculation systems. Further, actuation systems require filtered fuel flow to eliminate contamination which requires filters, piping, and other supporting equipment.

The conventional techniques have been considered satisfactory for their intended purpose. However, there is an ever-present need for improved systems and methods for handling heat loads in fuel systems. This disclosure provides a solution for this need.

SUMMARY

A system for supplying a washed fuel flow to an actuation system according to some examples can include an actuation pump sub-system (APS) with an inlet configured to feed fuel from a fuel source into the actuation pump sub-system, a first outlet, a second outlet, and a third outlet configured for connecting the actuation pump sub-system in fluid communication with the actuation system to supply fuel flow for actuation. A main pump and control sub-system (MPCS) has a main inlet connected in fluid communication with the supply line downstream of the second outlet of the APS, and a main outlet for supplying fuel to a downstream gas generator. An afterburner pump in fluid communication to supply an afterburner control. An afterburner selector valve (ASV) in fluid communication the third outlet to selectively fluidly connect the APS to the MPCS or to the afterburner pump outlet.

BRIEF DESCRIPTION OF THE DRAWINGS

FIG. 1 is a schematic perspective view of an embodiment of a system constructed in accordance with the present disclosure, showing an actuation pump sub-system (APS) supplying a washed fuel flow to an actuation system.

DETAILED DESCRIPTION

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to eliminate the need for fuel thermal recirculation system, by pairing a thermally efficient fuel system with the ability to modulate fuel flow to the fuel oil cooler (FOC) to prevent overcooling engine oil. Further, systems and methods described herein can be used to provide a washed fuel flow to an actuation system, eliminating the need for a barrier filter and associated piping, pipe connections, valves, and sensors. While the system and methods for providing washed fuel flow to the actuation system is depicted along with a system suitable for eliminating the fuel thermal recirculation system, it shall be understood that systems and methods described herein to provide washed fuel flow to the actuation system can be implemented in other fuel systems, including fuel systems with thermal recirculation systems.

The system 100 includes an actuation pump sub-system (APS) 102 with an inlet 104 configured to feed fuel from a fuel source, e.g. at pressure P0, into the APS 102, a first outlet 106 configured for connecting the APS 102 in fluid communication with an actuation system 108 to supply fuel flow for actuation such as for end effectors aboard an aircraft through a line 109. A fuel oil cooler (FOC) 110 is in a supply line 112 that is in fluid communication with the second outlet 114 of the APS 102. A bypass valve (BPV) 116 is in the supply line 112 in parallel with the FOC 110. A main pump and control sub-system (MPCS) 118 has a main inlet 120 connected in fluid communication with the supply line 112 downstream of the BPV 116 and FOC 110. The MPCS 118 includes a main outlet 122 for supplying fuel to a downstream gas generator (GG) 124 through a line 125, e.g. at elevated pressure P3. The gas generator (GG) can include fuel injectors in a combustor of a gas turbine engine.

The BPV 116 is configured to allow flow through the supply line 112, bypassing the FOC 110. Active control BPV 116, e.g. by the controller 126, can take 0-70% of total flow through the supply line 112, so the system 100 can be devoid of a thermal recirculation system.

A method of controlling, e.g. by the controller 126, heat transfer in the (FOC) 110 includes flowing fuel into an inlet 128 of the FOC 110, through the FOC 110, and out an outlet 130 of the FOC 110 to absorb heat from oil flowing through the FOC 110 while the oil has a temperature above a pre-determined overcooling limit. The method includes bypassing the FOC 110 through a BPV 116 connected in fluid communication with the inlet 128 and the outlet 130 in parallel with the FOC 110 when burn flow of fuel for a particular engine operating condition exceeds oil cooling demand, to avoid overcooling the oil beyond a predetermined overcooling limit. This also helps avoid overheating fuel in heat exchange with the oil without needing a thermal recirculation system on the aircraft. In this manner, bypassing the FOC 110 can be performed aboard an aircraft without flowing any fuel through any thermal recirculation system of the aircraft. If the operation of the BPV 116 can be properly tuned to the predetermined overcooling limit, the BPV 116 can be configured for passive operation as the controller 126 operates the MPCS 118 and the AFS 102.

A gearbox 132 is connected to drive one or more fuel pumps 134, 136 in the APS 102, and to drive one or more pumps 158 of the MPCS 118. An afterburner pump 138 is also operatively connected to be driven by the gearbox 132. The afterburner pump 138 is connected in fluid communication to receive flow from the supply line 112 via line 115 and to supply an afterburner control 140, which controls flow of fuel to the manifold and spray bars 142 of an afterburner system of the gas turbine engine of the aircraft. The line 144 that connects the afterburner pump 138 in fluid communication with the afterburner control 140 can be pressurized to the elevated pressure, PAFC, by afterburner pump 138.

The APS 102 includes a boost pump 134 operatively connected between the inlet 104 of the APS 102 and the second outlet 114 for boosting pressure of fuel from the supply at P0 to the pressure in the supply line 112, P1. A main filter 146 is a barrier filter included in the line connecting the boost pump 134 to the second outlet of the APS 114. The APS 102 includes a first variable displacement pump (VDP) 136 with a pump inlet in fluid communication to be supplied with filtered, boosted pressure P1F from the boost pump 134, downstream of the main filter 146, and a pump outlet connected in fluid communication by a line 148 with the third outlet 107 of the APS 102 providing flow pressurized at PHW. An actuation filter 170 is included in line 148 upstream of the third outlet 107. Actuation filter 170 is a wash filter whereby particles and debris collected on a filter element, a screen, or the like is continuously or periodically removed by a washing flow through line 148. A washed flow provided downstream of the filter element flows through first outlet 106 of APS 10 and along line 109 to actuation systems 108. An afterburner selector valve (ASV) 150 is fluidly connected to line 148 at third outlet 107 of ADS 102, and fluidly connects with pump outlet 160 of MPCS 118 via line 153. The ASV 150 is further connected in fluid communication with a line 152 connecting to the line 144 of the afterburner pump 138 for backup supply to the afterburner control 140 from the APS 102. The APS 102 includes a port 154 connected in fluid communication with the outlet of the boost pump 134, wherein the port 154 is connected in fluid communication with the actuation systems 108, with the afterburner pump 138, and with a port of the MPCS 118 via a branching line 156 that returns flow from the windmill bypass valve (WMBV) 164, from the actuation system 108, and from the afterburner pump 138, to the boost outlet.

The MPCS 118 includes a second VDP 158 with a pump inlet in fluid communication with the main inlet 120 of the MPCS 118, and a pump outlet line 160 in fluid communication with the main outlet 122 of the MPCS 118. A coarse and wash screens component 162 is included in the pump outlet line 160 upstream of the WMBV 164 and MV 166. A windmill bypass valve (WMBV) 164 is in fluid communication with a branch of the pump outlet line 160 and with the port 154 of the APS 102 for returning bypass flow to the APS 102 from the second VDP 158. A metering valve (MV) 166 in pump outlet line 160 is configured for metering flow to the gas generator 124. A main pump shut off valve (MPSOV) 168 in the pump outlet line 160 downstream of the MV 166 is configured to stop flow out of the MPCS 118 for shutoff.

The controller 126 is operatively connected to control the BPV 116 (if it is actively controlled), the first and second VDPs 136, 158, the MPSOV 168, the WMBV 164, the MV 166, the pressure control valve (PCV) 172, and the ASV 150, e.g. by electrically controlling the electrohydraulic servo valves (EHSVs) and solenoids (SOLs) indicated in FIG. 1. The PCV 172 controls the variable displacement mechanism of the VDP 158, whereas the VDP 136 can have its variable displacement mechanism controlled directly by an EHSV. The controller 126 is operatively connected to sensors, including the linear variable differential transformers LVDTs, resistance thermometer RTD, and pressure sensors P, in the MPCS 118 and APS 102 for feedback in controlling the BPV 116 (if it is actively controlled), the first and second VDPs 136, 158, the MPSOV 168, the WMBV 164, the MV 166, the PCV 172, and the ASV 150. The controller can include machine readable instructions in the form of analog circuits, solid state digital logic, or a processor can read the instructions to carry out the methods disclosed herein.

During steady state operation of system actuation systems 108, pressure within actuation systems 108 is not varying. In this state (i.e., a first state), ASV 150 fluidly connects the outlet of first VDP 136 to afterburner control 140 via line 148, line 153, line 115 and line 144, each line pressurized to PHW, while flow into line 152 and to MPCV 118 is blocked. Afterburner control 140 prevents flow into manifold 142 such that flow pressurized flow within line 144 recirculates to the pump outlet of boost pump 134 via line 145. Periodically, flow within line 109 may increase, supplying additional flow to actuation systems 108. While flow within line 109 increases relative to steady state operation, particles and debris momentarily collect on actuation filter 170. Once steady state operation of actuation systems 108 resumes, actuation systems 108 requires less pressure and/or flow from first VDP 136 and flow into line 109 returns to a nominal amount, allowing washing flow through 148 to remove particles and other debris from actuation filter 170. The duration of transient operation is brief relative to afterburner operation (e.g., one to three seconds) such that the accumulation of particles and debris during this period does not block flow through actuation filter 170.

During operation of afterburner pump 138, ASV 150 blocks line 152 and the pump controls block line 153 from line 115. In this state (i.e., a second state), line 152 is pressurized by afterburner pump 138 to PAFC while lines 153 and 148 are pressurized to PHW, which exceeds pressure P2 discharged by second VDP 158. In the second state, washed flow into line 151 and towards actuation system 108 increases relative to steady state operation. As before, actuator filter 170 accumulates particles and other debris as a result of increased washed flow relative to steady state operation. Actuation filter 170 is sized such that particles and debris do not block flow through line 109 for the duration of afterburner pump 138 operation. That is to say, afterburner pump 138 operation can be limited by the quantity of fuel held in reserve for afterburner combustion (e.g., three to five minutes). Upon completion of afterburner operation, afterburner pump 138 ceases operation and pump controls again fluidly connects the outlet of first VDP 138, line 148, and line 153 pressurizing flow within respective lines to PHW. As before, particles and debris accumulated by actuation filter 170 are removed by the washing flow through line 148. In a third state, where pump 102 has failed, ASV 150 transitions via the solenoid command to link pump 138 to the actuation systems 108 to provide pressure and flow via line 152, line 148 and line 109. In a fourth state, where pump 118 has failed, the ASV blocks line 152 and the pump controls block line 153 to line 115. Pump 138 provides pressure and flow to GG 124, via line 114, line 144 and line 125.

Systems and methods as disclosed herein provide various potential benefits including the following. They can eliminate thermal recirculation systems on aircraft. They can improve fuel system reliability. They can reduce fuel system weight/envelope, and can allow aircraft to carry more fuel.

The methods and systems of the present disclosure, as described above and shown in the drawings, provide for eliminating the need for fuel thermal recirculation system, by pairing a thermally efficient fuel system with the ability to modulate fuel flow to the fuel oil cooler (FOC) to prevent overcooling engine oil. Further, the methods and system of the preset disclosure, as described above and shown in the drawings, provided a washed fuel flow to the actuation system, eliminating the need for a barrier filter, and associated equipment. While the apparatus and methods of the subject disclosure have been shown and described with reference to preferred embodiments, those skilled in the art will readily appreciate that changes and/or modifications may be made thereto without departing from the scope of the subject disclosure.

Discussion of Possible Embodiments

The following are non-exclusive descriptions of possible embodiments of the present invention.

A System for Supplying a Washed Fuel Flow to an Actuation System

A system according to an example embodiment of this disclosure, among other possible things includes an actuation pump sub-system (APS), a main pump and control subsystem (MPCS), an afterburner pump, and an afterburner selection valve. The APS includes an inlet configured to feed fuel from a fuel source into the APS, a first outlet configured for connecting the ASPS in fluid communication with an actuation system to supply fuel flow for actuation, a second outlet, and a third outlet. The APS further includes a first variable displacement pump (VDP) and an actuation filter. The first VDP includes a pump inlet in fluid communication to be supplied with fuel from the fuel source and a pump outlet connected in fluid communication with the third outlet of the APS. The actuation filter is a wash filter in the line connecting the pump outlet of the first VDP for receiving a washing flow and fluidly communicating with a wash line for providing a washed flow to the first outlet. The MPCS includes a main inlet connected in fluid communication with a supply line downstream of the second outlet of the APS, and a main outlet for supplying fuel to a downstream gas generator. The afterburner pump is connected in fluid communication to supply an afterburner control. The ASV is in fluid communication with the MPCS, the wash line, and the afterburner pump. In a first state, the ASV fluidly connects the MPCS and the afterburner pump and blocks the wash line.

The system of the preceding paragraph can optionally include, additionally and/or alternatively, any one or more of the following features, configurations and/or additional components.

A further embodiment of the foregoing system, wherein the afterburner pump can be inoperative in the first state of the ASV.

A further embodiment of any of the foregoing systems, wherein during transient operation of the actuation system, the first VDP can increase the washed flow supplied to the actuation system relative to steady state operation of the actuation system.

A further embodiment of any of the foregoing systems, wherein in a second state, the ASV can fluidly connect the outlet of the first VDP to the MPCS and can block flow delivered to the outlet of the afterburner pump.

A further embodiment of any of the foregoing systems, wherein a pressure supplied by the first VDP can exceed a pressure supplied by the MPCS in the second state of the ASV.

A further embodiment of any of the foregoing systems, wherein the afterburner pump can operate in the second state of the ASV, supplying fuel to the afterburner control for a limited duration.

A further embodiment of any of the foregoing systems, wherein the APS can further include a boost pump operatively connected between the inlet of the APS and the second outlet of the APS for boosting pressure of fuel from the supply to the pressure in the supply line.

A further embodiment of any of the foregoing systems, wherein the pump inlet of the first VDP can receive fuel at a boost pressure from the outlet of the boost pump.

A further embodiment of any of the foregoing systems can include a fuel oil cooler (FOC) in a supply line that is in fluid communication with the second outlet of the APS.

A further embodiment of any of the foregoing systems can include a bypass valve (BPV) in the supply line, in parallel with the FOC configured to allow flow through the supply line bypassing the FOC.

A further embodiment of any of the foregoing systems, wherein the main inlet of the MPCS can be connected in fluid communication with the supply line downstream of the BPV and FOC.

A further embodiment of any of the foregoing systems, wherein the system can be devoid of a thermal recirculation system.

A further embodiment of any of the foregoing systems, wherein the APS can include a port connected in fluid communication with the outlet of the boost pump.

A further embodiment of any of the foregoing systems, wherein the port can be connected in fluid communication with the actuation systems, with the afterburner pump, and with a port of the MPCS.

A further embodiment of any of the foregoing systems, wherein the MPCS can include a second VDP with a pump inlet in fluid communication with the main inlet of the MPCS, and a pump outlet line in fluid communication with the main outlet of the MPCS.

A further embodiment of any of the foregoing systems can include a gearbox connected to drive one or more fuel pumps in the APS.

A further embodiment of any of the foregoing systems can include a gearbox connected to drive one or more pumps of the MPCS.

A further embodiment of any of the foregoing systems can include a gearbox connected to drive the afterburner pump.

A further embodiment of any of the foregoing systems can include a gearbox connected to drive one or more fuel pumps in the APS, one or more pumps of the MPCS, and the afterburner pump.

A further embodiment of any of the foregoing systems can include a metering valve (MV) in the pump outlet line, configured for metering flow to the gas generator.

A further embodiment of any of the foregoing systems can include a main pump shut off valve (MPSOV) in the pump outlet line downstream of the MV, configured to stop flow out of the MPCS for shutoff.

A further embodiment of any of the foregoing systems can include a coarse and wash screens component in the pump outlet line upstream of the WMBV and MV.

A further embodiment of any of the foregoing systems can include a main filter in a line connecting the boost pump to the second outlet of the APS.

A Method of Providing a Washed Fuel to an Actuation System

A method according to an example embodiment of this disclosure, among other possible steps includes selectively connecting, using an afterburner selector valve (ASV), a pressurized flow from a first variable displacement pump (VPD) to an afterburner pump supply line fluidly connected to an outlet of the afterburner pump in a first state.

The system of the preceding paragraph can optionally include, additionally and/or alternatively, any one or more of the following features, configurations, additional components, and/or steps.

A further embodiment of the foregoing method can include selectively connecting, using the afterburner selector valve (ASV), the pressurized flow from the outlet of the first VDP to an outlet of a main pump and control system (MPCS) in a second state.

A further embodiment of any of the foregoing methods can include flowing fuel into an inlet of an actuation pump sub-system (APS).

A further embodiment of any of the foregoing methods can include pressurizing the fuel received at the inlet of the APS using the first VDP.

A further embodiment of any of the foregoing methods can include flowing pressurized fuel from an outlet of the first VDP through an actuation filter.

A further embodiment of any of the foregoing methods, wherein the actuation filter can be a wash filter configured to receive a washing flow from the outlet of the first VDP and provide a washed flow along a wash line.

A further embodiment of any of the foregoing methods can include actuating the ASV to the first state.

A further embodiment of any of the foregoing methods can include supplying a washing flow through the actuation filter and to the outlet of the afterburner pump while the ASV is in the first state.

A further embodiment of any of the foregoing methods, wherein the afterburner pump can be inoperative while the ASV is in the first state.

A further embodiment of any of the foregoing methods can include actuating the ASV to the second state.

A further embodiment of any of the foregoing methods can include operating the afterburner pump for a limited duration while the ASV is in the second state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
an actuation pump sub-system (APS) with an inlet configured to feed fuel from a fuel source into the APS, a first outlet configured for connecting the APS in fluid communication with an actuation system to supply fuel flow for actuation, a second outlet, and a third outlet, wherein the APS comprises:
a first variable displacement pump (VDP) with a pump inlet in fluid communication with the fuel source, and a pump outlet connected in fluid communication with the third outlet of the APS; and
an actuation filter in the line connecting the pump outlet of the first VDP with the third outlet of the APS, wherein the actuation filter is a wash filter configured to receive a washing flow from the first VDP and configured to provide a washed flow to the first outlet in fluid communication with an actuation system;

a main pump and control sub-system (MPCS) with a main inlet connected in fluid communication with a supply line downstream of the second outlet of the APS, and a main outlet configured to supply fuel to a downstream gas generator;
an afterburner pump is connected in fluid communication with an afterburner control; and
an afterburner selector valve (ASV) in fluid communication with the MPCS, the first VDP, and an outlet of the afterburner pump, wherein in a first state, the ASV fluidly connects the first VDP and the outlet of the afterburner pump and blocks flow to the MPCS.

2. The system of claim 1, wherein the afterburner pump is inoperative in the first state of the ASV.

3. The system of claim 1, wherein during transient operation of the actuation system, the first VDP is configured to increase the washed flow supplied to the actuation system relative to steady state operation of the actuation system.

4. The system of claim 1, wherein in a second state, the ASV fluidly connects the outlet of the first VDP to the MPCS and blocks flow delivered to the outlet of the afterburner pump.

5. The system of claim 4, wherein a pressure at an outlet of the first VDP exceeds a pressure at an outlet of the MPCS in the second state of the ASV.

6. The system of claim 4, wherein the afterburner pump operates in the second state of the ASV and is configured to supply fuel to the afterburner control for a limited duration.

7. The system of claim 1, wherein the APS further comprising:
a boost pump operatively connected between the inlet of the APS and the second outlet of the APS for boosting pressure of fuel from the supply to the pressure in the supply line;
wherein the pump inlet of the first VDP receives fuel at a boost pressure from the outlet of the boost pump.

8. The system of claim 7, further comprising:
a fuel oil cooler (FOC) in a supply line that is in fluid communication with the second outlet of the APS; and
a bypass valve (BPV) in the supply line, in parallel with the FOC configured to allow flow through the supply line bypassing the FOC;
wherein the main inlet of the MPCS is connected in fluid communication with the supply line downstream of the BPV and FOC.

9. The system as recited in claim 8, wherein the system is devoid of a thermal recirculation system.

10. The system as recited in claim 8, wherein the APS includes a port connected in fluid communication with the outlet of the boost pump, wherein the port is connected in fluid communication with the actuation systems, with the afterburner pump, and with a port of the MPCS.

11. The system as recited in claim 10 wherein the MPCS includes a second VDP with a pump inlet in fluid communication with the main inlet of the MPCS, and a pump outlet line in fluid communication with the main outlet of the MPCS.

12. The system of claim 11, further comprising:
a gearbox connected to drive one or more fuel pumps in the APS, one or more pumps of the MPCS, and the afterburner pump.

13. The system as recited in claim 11, further comprising a metering valve (MV) in the pump outlet line, configured for metering flow to the gas generator.

14. The system as recited in claim 13, further comprising a main pump shut off valve (MPSOV) in the pump outlet line downstream of the MV, configured to stop flow out of the MPCS for shutoff.

15. The system as recited in claim 14, further comprising a coarse and wash screens component in the pump outlet line upstream of the WMBV and MV.

16. The system as recited in claim 14, further comprising a main filter in a line connecting the boost pump to the second outlet of the APS.

\* \* \* \* \*